United States Patent Office 2,784,788
Patented Mar. 12, 1957

2,784,788
ACIDIZING WELLS

William B. Hughes and Guido O. Grady, Tulsa, Okla., assignors to Cities Service Research and Development Company, New York, N. Y., a corporation of New Jersey No Drawing. Application August 26, 1955,
Serial No. 530,905

11 Claims. (Cl. 166—42)

This invention relates to a method of treating oil and gas wells, and more particularly relates to an improved acidizing process for increasing the permeability of oil-bearing siliceous formations.

The acidizing of oil-bearing strata by a variety of acidizing techniques to increase permeability and thereby increase oil production has met with considerable success when treating certain types of formations. In the conventional acidizing process, an acid solution generally under pressure is introduced or injected into the formation immediately adjacent to the borehole and forced to move outwardly from the well bore, attacking the formation as it moves. The attack by the acid generally takes the form of a leaching action which dissolves out certain of the materials in the strata, leaving a series of channels or crevices which permit increased oil flow to the producing well. In normal acidizing techniques presently used, the acid attack is directed to that material which constitutes the major portion of the formation and from which the formation generally takes its name. The amount and concentration of the acidizing solution used, and the length of treatment will depend on the particular type of formation undergoing treatment, the area being treated, and the degree of permeability increase desired.

The acidizing technique has been used successfully in treating formations surrounding producing wells operated under natural drives as well as in treating formations undergoing secondary recovery treatment in which artificial drives such as water flooding are used.

Experience has shown that the acid treatment of most strata will provide some increase in permeability. However, acidizing of certain formations has produced permeability decrease, probably due to the formation of insoluble precipitates resulting from the action of the acid on certain minerals present in the formation.

For example, most limestone formations are successfully treated with a hydrochloric acid solution to provide substantial increases in permeability. However, certain types of limestone, when treated with hydrochloric acid, show marked decrease in permeability, apparently due to the formation of gelatinous iron and aluminum hydrates. Similarly, acidization of siliceous formations, with which this invention is particularly concerned, has met with some favorable results when the formation is treated with a fluoride compound. Mixtures of hydrofluoric and hydrochloric acids have been used with some success in treating siliceous formations. When using the latter, however, gelatinous hydrofluosilicic acid is often precipitated, resulting in decreased permeability of the strata. Since the hydrofluoric-hydrochloric acid mixture is most effective in leaching siliceous formations, it has been suggested that undesirable precipitation of fluosilicic acid can be overcome by the use of sequestering agents or by first treating the siliceous formation with hydrofluoric acid, and thereafter treating the formation with hydrochloric acid so that precipitates formed as a result of the hydrofluoric acid attack on the formation can be removed by the hydrochloric acid. It has been suggested that sandstone containing calcium and magnesium salts can be treated in a two-stage process utilizing boric acid containing fluoboric acid solution followed by treatment with hydrofluoric acid containing fluoboric acid. It has also been suggested that undesirable precipitates of the siliceous type can be avoided when acidizing siliceous formations by utilizing a hydrochloric acid solution containing a small amount of ammonium bifluoride.

In all of the foregoing treatments the reactants are comparatively expensive and must be used in highly concentrated form and in substantial quantity. Moreover, conventional acidizing processes appear to be directed primarily to attacking and dissolving the silica or sand particles rather than dissolving the binding or cementing material which holds the sand grains together.

In many cases the suggested methods for avoiding undesirable recipitation during treatment of siliceous formations have not proven satisfactory. Conventional techniques have further disadvantages in that the reactant solutions in the concentrations used are extremely hazardous to handle and require expensive equipment to carry out the treatment.

It is accordingly an object of this invention to provide an improved acidizing solution and method which substantially increases permeability of siliceous strata without the formation of undesirable precipitates.

It is another object of this invention to provide an improved acidizing process using a treating solution which is highly effective in comparatively dilute concentration and does not require expensive handling equipment.

It is a further object of this invention to increase permeability of siliceous formations by utilizing an acid treating solution which is uniquely effective in attacking the silica binding or cementing material without any apparent direct attack on the silica itself.

These and other objects and advantages of our invention will be apparent from the description which follows.

As previously indicated, the use of a combined hydrofluoric-hydrochloric acid solution to treat siliceous formations to provide increased permeability is well known. Such a treating solution, however, as presently used, is extremely caustic, requires high concentration, and comparatively large quantities of the reactant. We have now found that if a small amount of a water-soluble alkali metal thiocyanate is added to the hydrochloric-hydrofluoric acid solution, unexpectedly high increases in permeability of siliceous formations can be obtained. We have found, for example, that treatment of such formations with a solution containing as little as 0.05% of sodium thiocyanate will provide permeability increases in the order of 1300%.

In carrying out an acidization treatment of siliceous formation according to the method of our invention, unexpectedly high increases in permeability are obtained if the strata is treated with a dilute aqueous solution of hydrochloric-hydrofluoric acid containing a small amount of water soluble alkali metal thiocyanate. We have further found that permeability increases of even greater magnitude can be obtained if the siliceous strata after treatment with the first treating solution described above is followed by a second treating solution of dilute sulfuric acid containing a small amount of a water soluble alkali metal thiocyanate.

The reason for these unexpectedly high increases in permeability is not clear although it is in some way connected to the presence of the thiocyanate compound.

The presence of the thiocyanate apparently permits the dilute acid treating solution to preferentially dissolve out the binding material that holds the sand grains together. This is most desirable since no action is taken on the silica which might result in the formation of various undesirable silicic acid precipitates.

It has been found that the first treating solution alone, under certain conditions, will provide such increases in permeability that the use of the second treating solution will be obviated.

The hydrochloric acid component of our improved acidizing solution which has proven so effective is the commercially available hydrochloric acid normally used in acidizing limestone formations. As used in our treating solutions, however, the acid is much less concentrated and is generally used in a strength of from about 3 to 15%. When combined with the other components of the solution, namely hydrofluoric acid and the thiocyanate compound, we have found that hydrochloric acid in a strength of from about 5% to about 15% provides the best results.

While the corrosion problem generally has to be considered when utilizing hydrochloric acid, the dilute solution used according to our invention, minimizes the corrosion problem. Moreover, if desired a small amount of an arsenic compound such as $As_2O_3$ or $AsCl_3$, when added to the hydrochloric acid will effectively inhibit its corrosive effect. Other suitable organic and inorganic inhibitors can be used with equally satisfactory results and with no adverse effect on the efficiency of the solution in providing increased permeability.

Other acids have been tried in combination with the hydrofluoric acid but have not proven satisfactory despite, in many cases, their high leaching power on siliceous strata. Certain of these acids are unsatisfactory because of the formation of undesirable precipitates or because of their extreme corrosiveness.

When in the course of acidizing siliceous strata, it appears desirable to follow the aqueous hydrochloric acid solution with dilute surfuric acid the hydrochloric acid solution may be referred to as the initial treating solution since in all cases it would be used prior to any treatment with sulfuric acid. As previously indicated the initial treating solution in addition to the dilute hydrochloric acid will contain hydrofluoric acid, generally in a strength of from about 1 to 3 percent by weight. The amount of hydrofluoric acid used is comparatively small and far less than the amount of such acid used in acidizing siliceous formations. While the amount used herein is small, satisfactory results cannot be obtained in the absence of hydrofluoric acid. Initial treating solutions of hydrochloric acid containing hydrofluoric acid in strengths greater than 3 percent have been used but we have found this unnecessary and undesirable. Where upwards of 10% hydrofluoric acid is used undesirable gelatinous materials are often precipitated. The undesirable effect of utilizing hydrofluoric acid in concentrations higher than about 3% will be apparent from Table I which follows. In Table I, a series of tests, indicated by numbers 1 to 5, were carried out on 25 gram samples of crushed bromide sandstone. The samples were treated at room temperature for one hour with 50 ml. solution of hydrofluoric acid in the strength indicated.

TABLE I

| Test | Percent HF | Percent Weight Loss |
| --- | --- | --- |
| 1 | 3 | 0.9 |
| 2 | 5 | 2.4 |
| 3 | 10 | 2.3 |
| 4 | 15 | 13.3 |
| 5 | 25 | 17.9 |

It will be noted that the weight loss for test 1 for a 3% hydrofluoric acid solution was 0.9%. Increasing the hydrofluoric acid strength to 5% as in test 2, resulted in a percentage weight loss of 2.4%. Visual observation of this test indicated the formation of a small amount of gelatinous material in the reaction container. This result, that is the formation of a gelatinous material, was more evident as the hydrofluoric acid strength was increased in tests 4 and 5. Utilization of the hydrofluoric acid in the initial treating solution in concentrations higher than 10% would defeat the purpose of our treatment which is primarily directed to attacking or dissolving the cementing material, preferably with no dissolution of an attack on the silica itself.

The water soluble alkali metal thiocyanate used in the initial treating solution is preferably sodium thiocyanate though other thiocyanates such as potassium may also be used. The thiocyanate is incorporated in an amount of from about 0.01 to about 0.5% by weight of the acid solution. While the amount of the thiocyanate utilized is comparatively small in terms of the other components of the initial treating solution, its presence is critical and permeability increases of the order desired cannot be obtained without it.

As will be apparent from the discussion of Table II which follows, increasing the amount of thiocyanate above 0.5 percent by weight does not appear to further enhance the effectiveness of the solution in dissolving the cementitious binding material.

To demonstrate the effectiveness the acidizing solution of our invention in dissolving the cementing material rather than the silica grains, and thereby providing increased permeability, a series of comparative weight loss tests were carried out on sandstone samples typical of the type in which our invention would be utilized. The results of these tests are recorded in Table II which follows. The test in each case was made on 25 grams of crushed bromide sandstone. obtained from the East Lindsay field at a depth of 10,400 feet. Each sample was treated for one hour at room temperature (74° F.) with the treating solution indicated added to 50 ml. of water.

TABLE II

| Test | Solution | Percent Weight Loss |
| --- | --- | --- |
| 1 | 0% HCl, 1% HF, 0.5 wt. percent NaSCN | 4.1 |
| 2 | 5% HCl, 1% HF, 0.5 wt. percent NaSCN | 8.4 |
| 3 | 10% HCl, 1% HF, 0.5 wt. percent NaSCN | 10.4 |
| 4 | 15% HCl, 1% HF, 0.5 wt. percent NaSCN | 10.6 |
| 5 | 20% HCl, 1% HF, 0.5 wt. percent NaSCN | 10.8 |
| 6 | 37.5% HCl, 1% HF, 0.5 wt. percent NaSCN | 11.3 |
| 7 | 10% HCl, 0% HF, 0.5 wt. percent NaSCN | 3.5 |
| 8 | 10% HCl, 3% HF, 0.5 wt. percent NaSCN | 12.3 |
| 9 | 10% HCl, 5% HF, 0.5 wt. percent NaSCN | 16.8 |
| 10 | 10% HCl, 10% HF, 0.5 wt. percent NaSCN | 19.1 |
| 11 | 10% HCl, 15% HF, 0.5 wt. percent NaSCN | 23.4 |
| 12 | 10% HCl, 25% HF, 0.5 wt. percent NaSCN | 33.1 |
| 13 | 10% HCl, 1% HF, 0 wt. percent NaSCN | 5.1 |
| 14 | 10% HCl, 5% HF, 0.05 wt. percent NaSCN | 18.5 |
| 15 | 10% HCl, 5% HF, 0.10 wt. percent NaSCN | 17.6 |
| 16 | 10% HCl, 5% HF, 0.20 wt. percent NaSCN | 17.3 |
| 17 | 10% HCl, 5% HF, 0.30 wt. percent NaSCN | 18.1 |
| 18 | 10% HCl, 5% HF, 0.40 wt. percent NaSCN | 18.3 |
| 19 | 10% HCl, 5% HF, 0.50 wt. percent NaSCN | 16.8 |
| 20 | 10% HCl, 1% HF, 0.05 wt. percent NaSCN | 21.3 |
| 21 | 10% HCl, 1% HF, 0.10 wt. percent NaSCN | 21.2 |

In tests 1, 7, and 13 above, weight losses are recorded for treatment carried out in which one of the components of the initial treating solution was removed. In test 1, the treating solution comprised 1% hydrofluoric acid and 0.5% by weight of sodium thiocyanate. The weight loss obtained was 4.1%. Similarly, in test 7, treatment was carried out in the absence of hydrofluoric acid. A weight loss of 3.5% was obtained. In test 13, a treating solution of 10% hydrochloric acid and 1% hydrofluoric acid containing no thiocyanate component, provided a weight loss of 5.1%. In all other tests, treatment of the sandstone samples with solutions prepared with varying percentages of the hydrochloric acid, hydrofluoric acid, and sodium thiocyanate resulted in substantial weight losses.

All the tests carried out with our improved acidizing solution provided weight losses in excess of 100% or more than the weight loss obtained when one of the components was removed from the acidizing solution.

As previously indicated it is generally desirable though not in all situations essential, that the initial treating solution be followed by a second treating solution of dilute sulfuric acid containing a small amount of a water soluble alkali metal thiocyanate. We have obtained very favorable permeability increases by following the initial treating solution with sulfuric solution of from about 3% to about 5% containing the water soluble alkali metal thiocyanate compound, preferably sodium thiocyanate, in an amount of from about 0.05% to 0.5% by weight of the sulfuric acid solution.

The desirability of following the initial treating solution with the dilute solution of sulfuric acid will be apparent from the following treatment of sandstone cores from the Wilson Moore #12 well. The cores were obtained from sandstone strata at a depth of 3,134 feet. Core P. 30 was first treated with an aqueous solution of 10% HCl containing 3% HF. No thiocyanate compound was present. The core was then treated with a second acid solution of dilute 4% sulfuric acid containing no thiocyanate.

After treatment the core P. 30 showed an increase in water permeability of about 200%. When however core P. 28 (obtained from the same well and the same strata) was treated with a first treating solution of dilute hydrochloric-hydrofluoric acid containing less than 0.1% by weight of sodium thiocyanate followed by treatment with dilute sulfuric acid containing approximately 0.1% by weight of sodium thiocyanate, an increase in water permeability of 1200% resulted.

Further evidence of the effectiveness of our improved acidizing solution and method of increasing permeability of siliceous formations will be apparent from the examples which follow:

*Example 1*

Flow of tap water (140 p. s. i.) through Bartlesville sandstone core S-7 (¾" x 1" mounted in Lucite) before acidizing according to the method of our invention was determined to be 1 cc. per 33 seconds. Core S-7 was treated with a 100 cc. solution of 1% HF and 0.05% NaSCN. The core was then treated with a second 100 cc. solution of 3% $H_2SO_4$ containing 0.05% NaSCN. A flow rate increase to 1 cc. per 10 seconds was recorded. Further treatment of core S-7 with a 100 cc. solution of 15% HCl, 0.05% NaSCN and 1% HF followed by treatment with a 100 cc. solution of 3% $H_2SO_4$ containing 0.05% NaSCN resulted in an increased water flow rate of 1 cc. per 1.5 seconds.

*Example 2*

Flow rate of tap water (140 p. s. i.) through the Bartlesville sandstone core P. 28 (¾" x 1" mounted in Lucite) prior to treatment was determined as 1 cc. per one minute 34 seconds. P. 28 was then treated with 100 cc. solution of 15% HCl, 0.05% NaSCN and 1.0% HF followed by 100 cc. solution of 3% $H_2SO_4$ and 0.05% NaSCN. Flow rate of tap water (140 p. s. i.) after treatment was increased to 1 cc. per 2.8 seconds.

*Example 3*

Water flow rate (140 p. s. i.) through Bartlesville sandstone core P. 18 (¾" x 1" mounted in Lucite) prior to treatment was 1 cc. per 45 seconds. Core P. 18 was treated according to the method of our invention with a 100 cc. solution of 15% HCl, 0.05% NaSCN and 1.0% HF followed by a 100 cc. solution of 3% $H_2SO_4$ and 0.05% NaSCN. Water flow rate after treatment was 1 cc. per 2.5 seconds.

It is essential that the solutions used in our method be prepared substantially within the range or ratio described. The total amount of the treating solutions used will, of course, depend on the area and depth of the strata being treated. Treatment may be carried out initially on completion of the well or any time thereafter during the producing life of the well. Acidization according to the method of our invention, may also be carried out in conjunction with a secondary recovery operation either simultaneously therewith or prior to the initiation of such a program.

Under certain conditions it may be desirable to include a surface-active agent with the initial acidizing solution to obtain better contact between the reactant solution and the formation. The amount of surface-active agent used can be varied considerably and will normally be used in an amount from about 1 to about 100 p. p. m. If desired, a small amount of a de-emulsifying agent may also be incorporated with the treating solutions. The addition of a small amount of a de-emulsifying agent prevents the formation of emulsions which often occur as a result of the contact of the hydrochloric acid solution with the crude oil present in the strata. The addition of a de-emulsifier in an amount of from about 1 to 100 p. p. m. effectively prevents the formation of emulsions and thereby enhances the effectiveness of the treating solutions.

While we have described certain preferred embodiments of our invention, it will be understood that we do not intend to limit this invention other than by scope of the claims appended hereafter.

We claim:

1. A method of increasing the permeability of siliceous strata which comprises introducing into the strata an aqueous solution containing from 3% to 15% hydrochloric acid, from 1% to 3% hydrofluoric acid, and from 0.01% to 0.5% of a water-soluble alkali metal thiocyanate compound.

2. A method of increasing the permeability of siliceous strata which comprises introducing into the strata an aqueous solution containing from 3% to 15% hydrochloric acid, from 1% to 3% hydrofluoric acid, and from 0.01% to 0.5% of a water-soluble alkali metal thiocyanate compound, maintaining sufficient pressure on said aqueous solution to force the same into contact with the siliceous formation to react the same therewith, flushing the said solution from the strata after reaction has been substantially completed, and introducing a second solution into said strata, said second solution comprising dilute sulfuric acid in a strength of from 1% to 4%, said sulfuric acid containing a water-soluble alkali metal thiocyanate compound in an amount from 0.01% to 0.5% by weight of the sulfuric acid.

3. The method of increasing the permeability of siliceous strata as claimed in claim 2, wherein the water-souble alkali metal thiocyanate contained in the aqueous solution is sodium thiocyanate.

4. The method of increasing the permeability of siliceous strata as claimed in claim 1, wherein the water-soluble alkali metal thiocyanate is sodium thiocyanate.

5. The method of increasing the permeability of siliceous strata as claimed in claim 2, wherein the water-soluble alkali metal thiocyanate introduced into the sulfuric acid solution is sodium thiocyanate.

6. A method of increasing the permeability of siliceous strata which comprises introducing into the strata a dilute aqueous solution comprising 10% hydrochloric acid, 3% hydrofluoric acid, and sodium thiocyanate in an amount of from 0.01% to 0.5% by weight of the total acid solution.

7. A method of increasing the permeability of siliceous strata which comprises introducing into the strata a dilute aqueous solution comprising 15% hydrochloric acid, 1.0% hydrofluoric acid, and 0.5% by weight of sodium thiocyanate, and following said dilute aqueous solution with a second solution comprising 3% sulfuric acid containing 0.5% by weight of sodium thiocyanate.

8. An aqueous composition for acidizing siliceous formations comprising 5% to 15% hydrochloric acid, 1% to 3% hydrofluoric acid, and from 0.01% to 0.5% by weight of a water-soluble alkali metal thiocyanate compound.

9. A composition for acidizing siliceous formations as claimed in claim 8, wherein the water-soluble alkali metal thiocyanate is sodium thiocyanate.

10. A composition for acidizing siliceous formations as claimed in claim 8 wherein the water-soluble alkali metal thiocyanate is potassium thiocyanate.

11. A composition for increasing permeability in siliceous formations comprising 15% hydrochloric acid, 1.0% hydrofluoric acid, and 0.05% sodium thiocyanate.

References Cited in the file of this patent

UNITED STATES PATENTS

| | | |
|---|---|---|
| 2,094,479 | Vandergrift | Sept. 28, 1937 |
| 2,225,695 | Henderson et al. | Dec. 27, 1954 |

FOREIGN PATENTS

| | | |
|---|---|---|
| 702,946 | Great Britain | Jan. 27, 1954 |
| 1,005,090 | France | Dec. 12, 1951 |